C. B. PAYNE,

Assignor to himself and S. LOGAN.

CHECK HOOK.

No. 9,932. Reissued Nov. 15, 1881.

Chas. J. Buchheit.
Edw. J. Brady.
Witnesses.

Chas. B. Payne, Inventor.
By Wilhelm Bonner.
Attorneys.

N. PETERS, Photo-Lithographer, Washington, D. C.

UNITED STATES PATENT OFFICE.

CHARLES B. PAYNE, OF CLINTON, ILLINOIS, ASSIGNOR TO HIMSELF AND SAMUEL LOGAN, OF SAME PLACE.

CHECK-HOOK.

SPECIFICATION forming part of Reissued Letters Patent No. 9,932, dated November 15, 1881.

Original No. 92,879, dated July 20, 1869. Application for reissue filed October 8, 1881.

*To all whom it may concern:*

Be it known that I, CHARLES B. PAYNE, of Clinton, in the county of De Witt, and in the State of Illinois, have invented certain new and useful Improvements in Check-Hooks; and I do hereby declare that the following is a full, clear, and exact description thereof, reference being had to the accompanying drawings, and to the letters of reference marked thereon.

The nature of my invention consists in the construction of a check-hook, and in providing the same with a stationary tongue for the purpose of holding the strap that crosses the flat surface of the hook, and of preventing the bridle-rein from becoming detached when in use.

In order to enable others skilled in the art to which my invention appertains to make and use the same, I will now proceed to describe its construction and operation, referring to the annexed drawings, which form a part of this specification, and in which—

Figure 1:
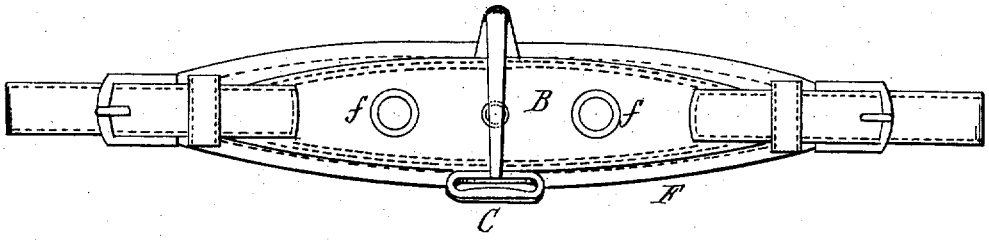
Figure 2:
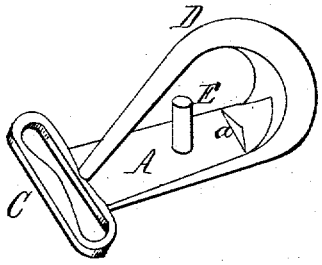

Figure 1 is a plan view of a saddle with my check-hook attached, and Fig. 2 is a perspective view of the check-hook.

A represents the flat surface of the check-hook over which the strap B passes. At one end is the raised breeching-loop C and at the other the hook D, which has a shoulder, *a*, at the front, as shown in Fig. 2. The breeching-loop C being raised and the hook D having the shoulder *a*, prevents the hook from working backward and forward, as the strap B fits in between the two, thus holding it.

In the center of the flat surface A is a stationary tongue, E, which projects through a hole cut in the strap B and extends up nearly to the hook D, thus not only keeping the whole hook in its place, but also preventing the bridle-rein from becoming detached.

The whole check-hook, including the stationary tongue, may be cast in one piece of any kind of metal desired. As shown in the drawings, the check-hook is secured between the strap B, running over the plate A of the hook, and a strap, F, arranged underneath the plate of the hook, both straps being connected by rivets *f*.

Having thus fully described my invention, what I claim as new, and desire to secure by Letters Patent, is—

1. An improved check-hook, consisting of a flat base-plate, A, having at one end a hook, D, and a loop, C, at the opposite end, and provided with an upwardly-projecting stationary tongue, E, adapted to pass through the back-strap, and also to prevent the check-rein from being disengaged from the hook, all substantially as set forth.

2. The flat plate A, with shoulder *a*, loop C, and tongue E, adapted to receive the back-strap and project above its surface, and with hook D, all connected to the parts of the leather by the rivets, as herein shown and described.

CHARLES B. PAYNE.

Witnesses:

GEO. McC. REX,

J. H. CLARK.